(12) United States Patent
Lee et al.

(10) Patent No.: US 11,022,844 B2
(45) Date of Patent: Jun. 1, 2021

(54) DISPLAY DEVICE AND MANUFACTURING METHOD THEREOF

(71) Applicant: Samsung Display Co., Ltd., Yongin-si (KR)

(72) Inventors: Heekeun Lee, Suwon-si (KR); Taejin Kong, Suwon-si (KR); Wontae Kim, Suwon-si (KR); Keunwoo Park, Incheon (KR); Yeogeon Yoon, Suwon-si (KR); Seokjoon Hong, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/226,377

(22) Filed: Dec. 19, 2018

(65) Prior Publication Data
US 2019/0196274 A1 Jun. 27, 2019

(30) Foreign Application Priority Data
Dec. 22, 2017 (KR) .......................... 10-2017-0178544

(51) Int. Cl.
*G02F 1/13357* (2006.01)
*G02F 1/1335* (2006.01)

(52) U.S. Cl.
CPC .. *G02F 1/133617* (2013.01); *G02F 1/133614* (2021.01)

(58) Field of Classification Search
CPC ......... G02F 1/133514; G02F 1/133617; G02F 1/133621; G02F 2001/133614
See application file for complete search history.

(56) References Cited

U.S. PATENT DOCUMENTS

| | | | |
|---|---|---|---|
| 9,575,228 B2 | 2/2017 | Kim et al. | |
| 2015/0205159 A1* | 7/2015 | Itou | G02F 1/133514 349/110 |
| 2016/0216417 A1 | 7/2016 | Cross et al. | |
| 2016/0306226 A1* | 10/2016 | Yoon | G02F 1/133377 |
| 2017/0031205 A1 | 2/2017 | Lee | |
| 2017/0059940 A1 | 3/2017 | Kim et al. | |

FOREIGN PATENT DOCUMENTS

| | | |
|---|---|---|
| KR | 10-2015-0116022 | 10/2015 |
| KR | 10-2016-0124977 | 10/2016 |
| KR | 10-2017-0014755 | 2/2017 |
| KR | 10-2017-0027276 | 3/2017 |

* cited by examiner

*Primary Examiner* — Thanh Nhan P Nguyen
(74) *Attorney, Agent, or Firm* — H.C. Park & Associates, PLC

(57) ABSTRACT

A display device including: a display panel; a light source providing light to the display panel; and a color conversion unit converting a color of the light incident from the light source into a different color. The color conversion unit includes: a first color converting member, a second color converting member, and a third color converting member, located on a substrate, which convert the color of the light incident from the light source into different colors from each other, respectively, and output the lights having converted colors; and a blue light blocking filter located to overlap the second color converting member and the third color converting member. The blue light blocking filter is thicker at a boundary portion than at a center portion thereof.

17 Claims, 19 Drawing Sheets

DISPLAY DEVICE AND MANUFACTURING METHOD THEREOF

CROSS-REFERENCE TO RELATED APPLICATION

This application claims priority from and the benefit of Korean Patent Application No. 10-2017-0178544, filed on Dec. 22, 2017, which is hereby incorporated by reference for all purposes as if fully set forth herein.

BACKGROUND

Field

Exemplary embodiments of the present invention relate to a display device and to a method of manufacturing the display device.

Discussion of the Background

Liquid crystal display ("LCD") devices are a type of flat panel display devices that are currently in wide use. The LCD devices include two display panels at which electric field generating electrodes, such as a pixel electrode and a common electrode, are formed, and a liquid crystal layer interposed therebetween. When a voltage is applied to the electric field generating electrodes, an electric field is generated in the liquid crystal layer, which orients liquid crystal molecules in the liquid crystal layer and controls the polarization of the incident light, thereby displaying images.

The LCD devices use color filters to obtain different colors in the displayed image. In such a case, the luminous efficiency of the LCD devices is relatively low, because when light emitted from a backlight source passes through a red color filter, a green color filter, and a blue color filter, the amount of light is reduced to about ⅓ by each color filter. Photo-luminescent liquid crystal display (PL-LCD) devices, which are suggested to compensate for the degradation of luminous efficiency and improve color reproducibility, are LCD devices in which the color filter used for the conventional LCD devices are replaced with a quantum dot color conversion layer (QDCCL). The PL-LCD devices display color images by using visible light which is generated when light of a low wavelength range, such as ultraviolet light or blue light, emitted from a light source and controlled by a liquid crystal layer, is irradiated to a color conversion layer (CCL).

Such PL-LCD devices have relatively high panel manufacturing costs due to a relatively large number of photo processes, as compared to general LCD processes. Thus, studies are being conducted to reduce panel manufacturing costs.

The above information disclosed in this Background section is only for understanding of the background of the inventive concepts, and, therefore, it may contain information that does not constitute prior art.

SUMMARY

Exemplary embodiments of the present invention provide a method of manufacturing a color conversion unit having reduced costs and time obtained by simplifying manufacturing processes; a color conversion unit manufactured through the method; and a display device including the color conversion unit.

Additional features of the inventive concepts will be set forth in the description which follows, and in part will be apparent from the description, or may be learned by practice of the inventive concepts.

An exemplary embodiment provides a display device including: a display panel; a light source providing light to the display panel; and a color conversion unit converting a color of the light incident from the light source into a different color. The color conversion unit includes: a first color converting member, a second color converting member, and a third color converting member, located on a substrate, which convert the color of the light incident from the light source into colors different from each other, respectively, and output the light having converted colors; and a blue light blocking filter located to overlap the second color converting member and the third color converting member. The blue light blocking filter is thicker at a boundary portion than at a center portion thereof.

A side surface of the first color converting member may contact a side surface of the blue light blocking filter.

The boundary portion of the blue light blocking filter may have a thickness greater than a thickness of the center portion of the blue light blocking filter by about 0.05 μm to about 0.1 μm.

The first color converting member may further include a coating layer having hydrophobicity against the blue light blocking filter.

The coating layer may be tetrafluorocarbon.

The blue light blocking filter may have an inclination angle in a range from about 10 degrees to about 40 degrees at the boundary portion.

The first color converting member may have a height in a range from about 6 μm to about 7 μm.

The blue light blocking filter may have a height in a range from about 1.2 μm to about 1.7 μm.

The first color converting member may have a groove portion which extends in a width direction.

The first color converting member may include at least one protruding portion which protrudes in a width direction on a plane.

The protruding portions may be arranged alternately with each other.

The display device may further include a black matrix disposed between the color converting members.

The color conversion unit may be disposed on the display panel.

The display panel may include: a first substrate on which a thin film transistor and a pixel electrode are disposed; a second substrate opposing the first substrate; and a liquid crystal layer between the first substrate and the second substrate. The color conversion unit may be disposed between the first substrate and the liquid crystal layer or between the second substrate and the liquid crystal layer.

The second color converting member and the third color converting member may include quantum dots.

The light source may be a blue light source.

Another exemplary embodiment discloses a method of manufacturing a display device including: preparing a display substrate; forming a first color converting member on the display substrate using a first mask; forming a blue light blocking filter by coating a blue light blocking material on a substrate on which the first color converting member is formed; forming a second color converting member on the blue light blocking filter using a second mask; and forming a third color converting member on the blue light blocking filter using a third mask. The blue light blocking filter is formed to be thicker at a boundary portion than at a center portion.

Forming of the first color converting member may include: further forming, on the first color converting member, a coating layer having hydrophobicity against the blue light blocking filter.

Forming of the first color converting member may include: forming a first color converting member having a groove portion or including a protruding portion by using the first mask. The groove portion may extend in a width direction. The protruding portion may protrude in the width direction.

Preparing of the display substrate may include: forming a thin film transistor on a first substrate; and forming a pixel electrode connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
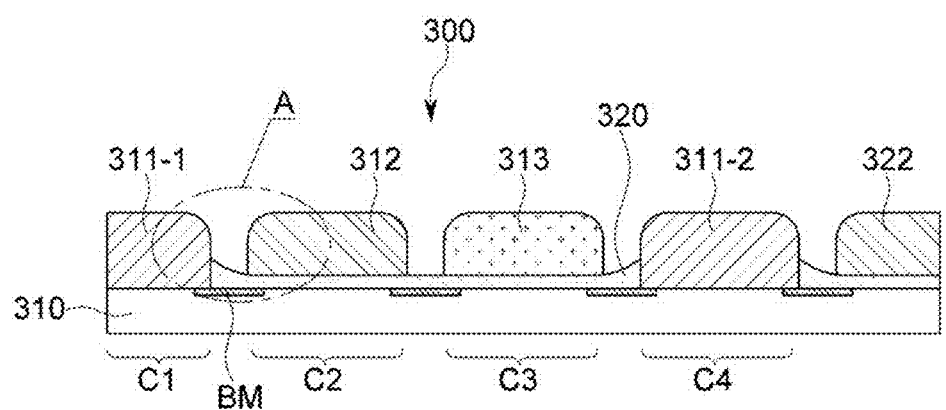
FIG. 1 is a schematic cross-sectional view illustrating a color conversion unit according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2A:
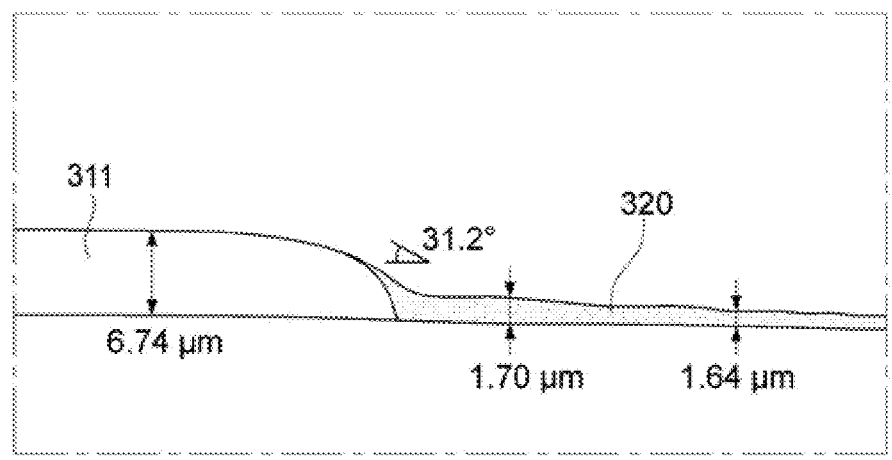
FIG. 2A is an enlarged cross-sectional view of a portion "A" of FIG. 1.
Figure 2B:
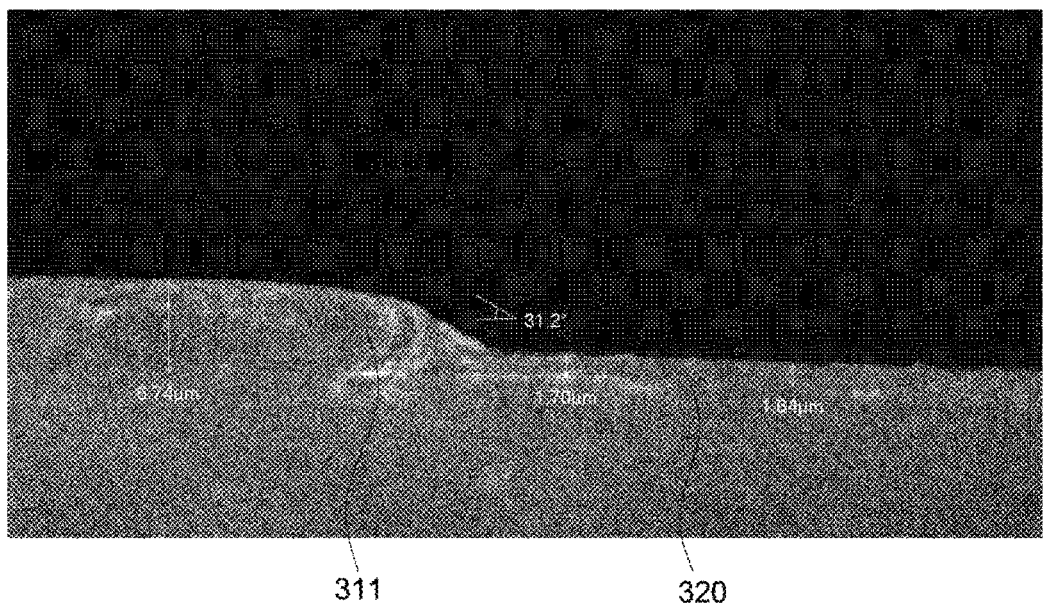
FIG. 2B is a SEM photograph of the portion "A" of FIG. 1.

FIG. 1 is a schematic cross-sectional view illustrating a color conversion unit according to an exemplary embodiment of the present invention, FIG. 2A is an enlarged cross-sectional view of a portion "A" of FIG. 1, FIG. 2B is a SEM photograph of the portion "A" of FIG. 1, and FIGS. 3A to 7 are plan views illustrating the shape of color converting members according to an exemplary embodiment of the present invention.

Hereinafter, a color conversion unit will be described with reference to FIGS. 1 to 6C.

A color conversion unit 300 includes a plurality of color converting members 311, 312, and 313, and a blue light blocking filter 320, which are located on a substrate 310.

The substrate 310 includes first to fourth pixel areas C1, C2, C3, and C4, and the color conversion unit 300 is disposed in each pixel area.

The color conversion unit 300 includes a first color converting member 311, a second color converting member 312, and a third color converting member 313.

The first color converting member 311, the second color converting member 312, and the third color converting member 313 receive the same light to convert the light into different colors, respectively, and emit the lights having the converted colors.

For example, when a blue light is incident to the first color converting member 311 at the first pixel area C1, the second color converting member 312 at the second pixel area C2, and the third color converting member 312 at the third pixel area C3, the blue light, the red light, and the green light may be emitted from the first, second, and third pixel areas C1, C2, and C3, respectively.

The first color converting member 311 includes a transparent polymer and transmits the blue light provided from a light source to emit a blue light. The first color converting member 311 corresponding to an area for emitting a blue light includes a material, for example, a polymer, such as a photosensitive resin (e.g., $TiO_2$), which emits the incident blue light without including separate phosphors or quantum dots.

The second color converting member 312 and the third color converting member 313 convert the light incident from the light source into lights having different colors from each other. The second color converting member 312 converts the blue light provided from the light source into a red light and outputs the red light, and the third color converting member 313 converts the blue light provided from the light source into a green light and outputs the green light.

The second color converting member 312 and the third color converting member 313 may include quantum dots for converting the color.

In such an exemplary embodiment, compounds each including two elements, compounds each including three elements, or compounds each including four elements may exist in particles at a uniform concentration, or may exist in a same particle with partially different concentration distribution. In addition, the quantum dots may have a core/shell structure in which one quantum dot surrounds another quantum dot. An interface between the core and the shell may have a concentration gradient in which the concentration of the elements existing in the shell becomes lower toward the center.

The blue light blocking filter 320 overlaps the second color converting member 312 and the third color converting member 313. In addition, the blue light blocking filter 320 is formed to be connected between the second color converting member 312 and the third color converting member 313.

A side surface of the blue light blocking filter 320 is formed to contact a side surface of the first color converting member 311.

The blue light blocking filter 320 has a shape in which a thickness thereof decreases from a side surface of the blue light blocking filter 320 that contacts the first color converting member 311 toward a center portion of the blue light blocking filter 320. As illustrated in FIG. 2A, a height of an edge portion of the blue light blocking filter 320 is greater than a height of the center portion of the blue light blocking filter 320. The edge portion of the blue light blocking filter 320 has an inclination angle of an acute angle. The inclination angle is in a range from about 10 degrees to about 40 degrees.

The blue light blocking filter 320 has a height in a range from about 1.2 µm to about 1.7 µm, and the edge portion of the blue light blocking filter 320 is formed to be higher than the center portion of the blue light blocking filter 320 by about 0.05 µm to about 0.1 µm.

The blue light blocking filter 320 may include, or be formed of, a mixture of one of $BiO_2$, $ZnO$, and $Ce_2O_3$, and one of $ZrO_2$, $TiO$, and $Ar_2O_3$. However, the inventive concepts are not limited thereto, and the blue light blocking filter 320 may include or be formed of any material for blocking blue light.

Since the blue light blocking filter 320 absorbs light in a wavelength range of about 400 nm to about 500 nm, only the blue light having the aforementioned wavelength range is blocked. In such an exemplary embodiment, a transmittance of the blue light blocking filter 320 is about 5% or less at a wavelength of about 450 nm, about 80% or more at a wavelength of about 535 nm, and about 90% or more at a wavelength of about 650 nm.

That is, the blue light blocking filter 320 substantially prevents a color mixture in the process in which the blue light emitted from the light source passes through the second color converting member 312 and the third color converting member 313 to implement a red color R and a green color G.

A black matrix BM including a material that does not transmit light may be formed between each pixel area.

That is, the black matrix BM may be formed between each of the first color converting member 311, the second color converting member 312, and the third color converting member 313.

Although the black matrix BM is disposed below the color conversion unit 300 in an exemplary embodiment of the present invention, the inventive concepts are not limited thereto. In another exemplary embodiment, the black matrix BM may be disposed above the color conversion unit 300.

A planarizing layer (not illustrated) may be disposed on the black matrix BM to remove a step difference, which may occur due to the black matrix BM. Such a planarizing layer may include an organic material. The planarizing layer may be omitted in other exemplary embodiments.

Figure 3A:
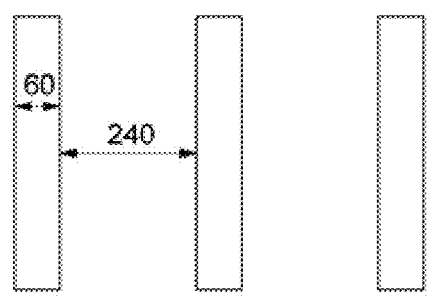
FIG. 3A and FIG. 3B are plan views illustrating a shape of a color converting member according to an exemplary embodiment of the present invention.
Figure 3B:
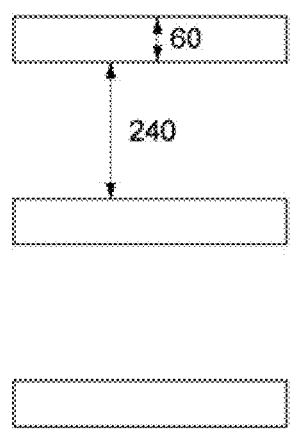

As illustrated in FIGS. 3A and 3B, the first color converting member 311 may have a stripe pattern corresponding to a shape of a pixel electrode (not illustrated). Each of a plurality of stripe shapes is spaced apart from each other on a substrate. Each of the plurality of stripe shapes has a width of about 60 µm, and a distance between each of the stripe shapes is about 240 µm. The stripe shapes may be arranged horizontally or vertically.

Figure 4:
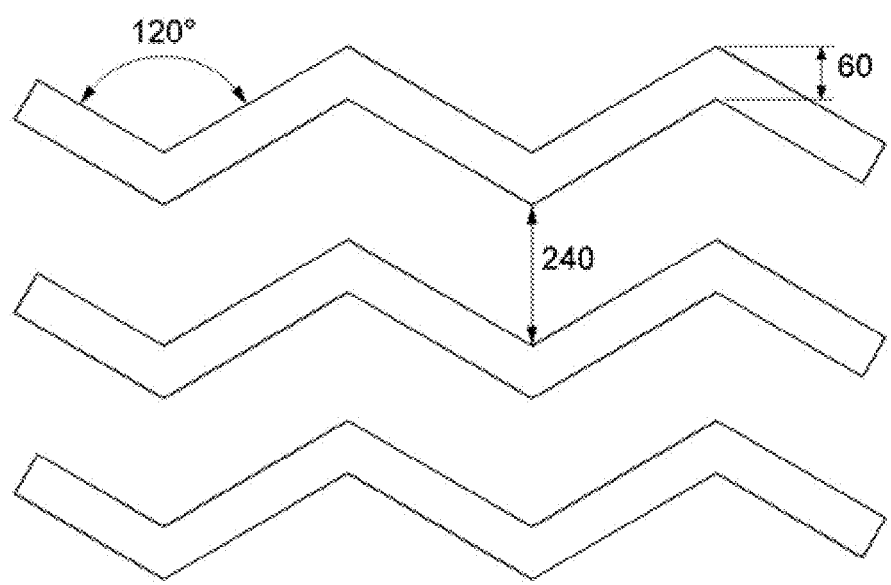
FIG. 4 is a plan view illustrating a shape of a color converting member according to another exemplary embodiment of the present invention.

As illustrated in FIG. 4, the first color converting member 311 may have a triangular wave shape corresponding to the shape of the pixel electrode (not illustrated). Each of a plurality of triangular waves is spaced apart from each other on a substrate. Each of the plurality of triangular waves has an obtuse angle of about 120 degrees and has a width of about 60 µm. A distance between the triangular waves is about 240 µm.

Figure 5A:
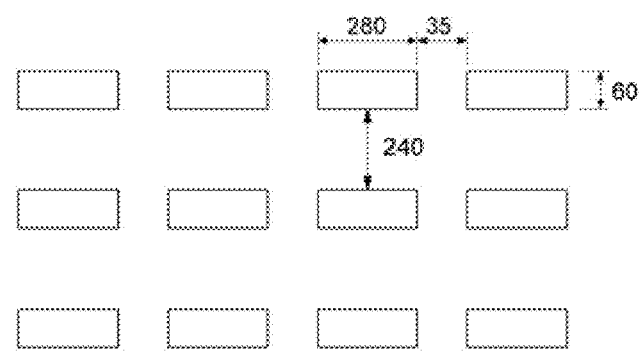
FIG. 5A and FIG. 5B are plan views illustrating a shape of a color converting member according to another exemplary embodiment of the present invention.
Figure 5B:
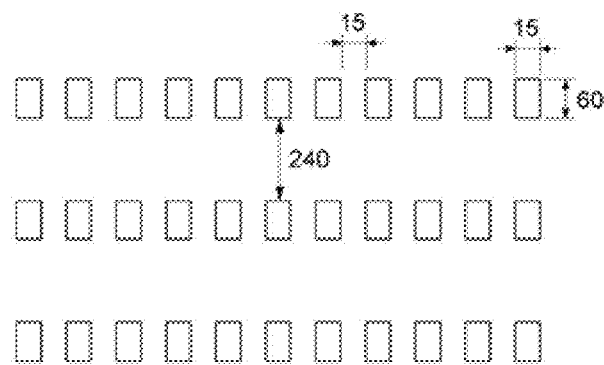

As illustrated in FIGS. 5A and 5B, the first color converting member 311 may have an island shape corresponding to the shape of the pixel electrode (not illustrated). The plurality of island shapes are spaced apart from each other on the substrate.

The island shape shown in FIGS. 5A and 5B may be a quadrangular shape or a quadrangular shape with a convex portion at the center thereof. The plurality of island shapes may be arranged horizontally or vertically. A distance between the island shapes in a same column may be about 240 µm.

Each island shape illustrated in FIG. 5A has a width of about 60 µm and a length of about 280 µm, and a gap between the island shapes in a same row is about 35 µm. Each island shape illustrated in FIG. 5B has a width of about 60 µm and a length of about 15 µm, and a gap between the island shapes in a same row is about 15 µm.

The distance between the island shapes may be freely changed by about 6 µm or more.

Figure 6A:
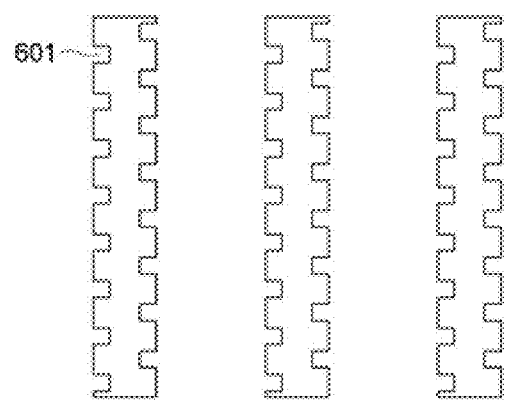
FIG. 6A, FIG. 6B, and FIG. 6C are plan views illustrating a shape of a color converting member according to another exemplary embodiment of the present invention.
Figure 6B:
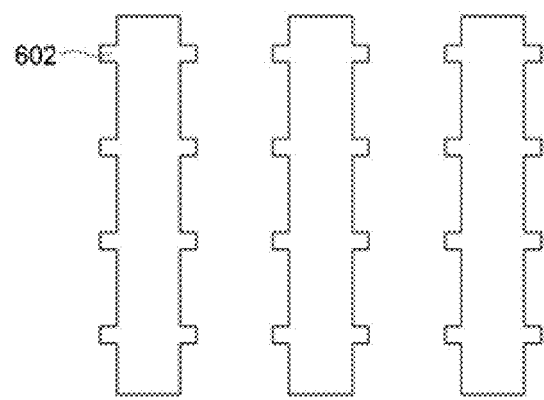
Figure 6:
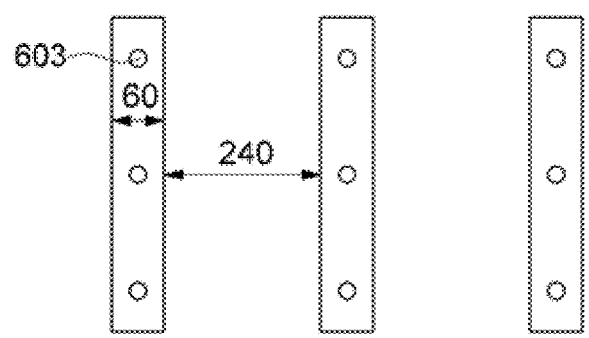

Referring to FIG. 6A, the first color converting member has a groove portion 601 which extends in a width direction on a plane. Referring to FIG. 6B, the first color converting member has at least one protruding portion 602 which protrudes in the width direction on a plane. In addition, referring to FIG. 6C, at least one groove portion 603 is provided on the first color conversion panel.

The groove portions 601 are alternately arranged, as illustrated in FIG. 6A. Alternatively, the protruding portions 602 are arranged to correspond to each other, as illustrated in FIG. 6B.

A distance between the protruding portions 602 or between the groove portions 601 may be changed without constraint.

Figure 7:
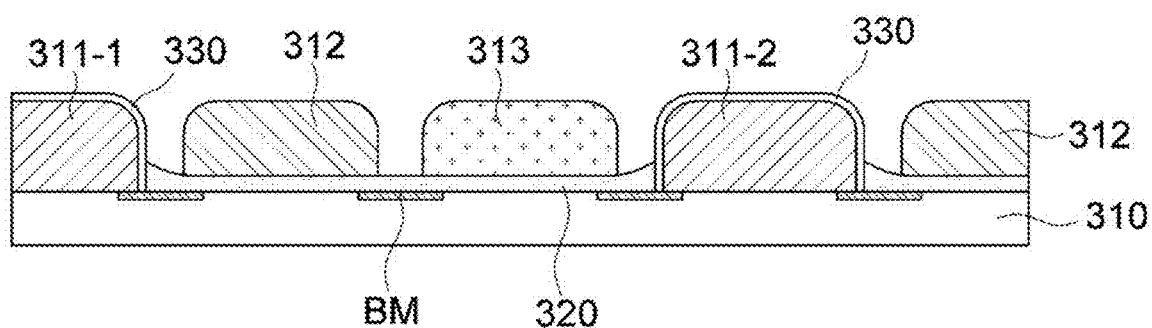
FIG. 7 is a schematic cross-sectional view illustrating a color conversion unit according to another exemplary embodiment of the present invention.

FIG. 7 is a schematic cross-sectional view illustrating a color conversion unit according to another exemplary embodiment of the present invention.

The same reference numerals as those in FIG. 1 denote the same components, and a detailed description thereof will be omitted.

The first color converting member 311 further includes a coating layer 330 having hydrophobicity against the blue light blocking filter.

The coating layer 330 may be formed by coating an element including fluorine (F). An example of the element including fluorine (F) may be $CF_4$, but the inventive concepts are not limited thereto.

Figure 8:
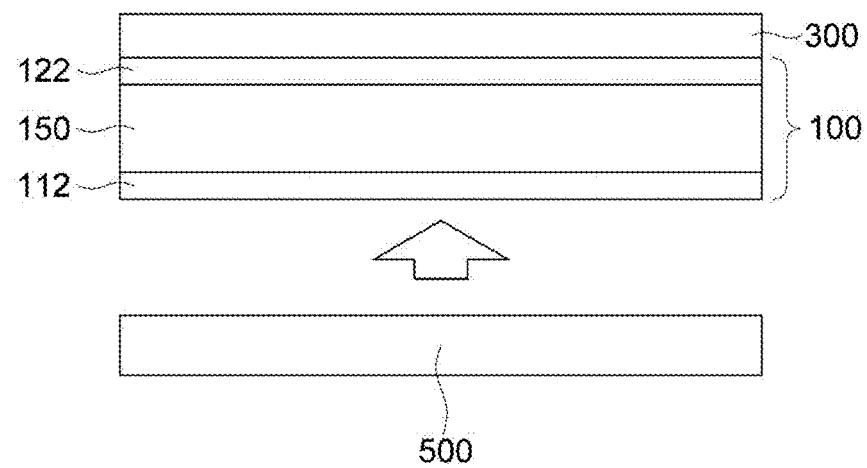
FIG. 8 is a schematic cross-sectional view illustrating a display device according to an exemplary embodiment of the present invention.
Figure 9:
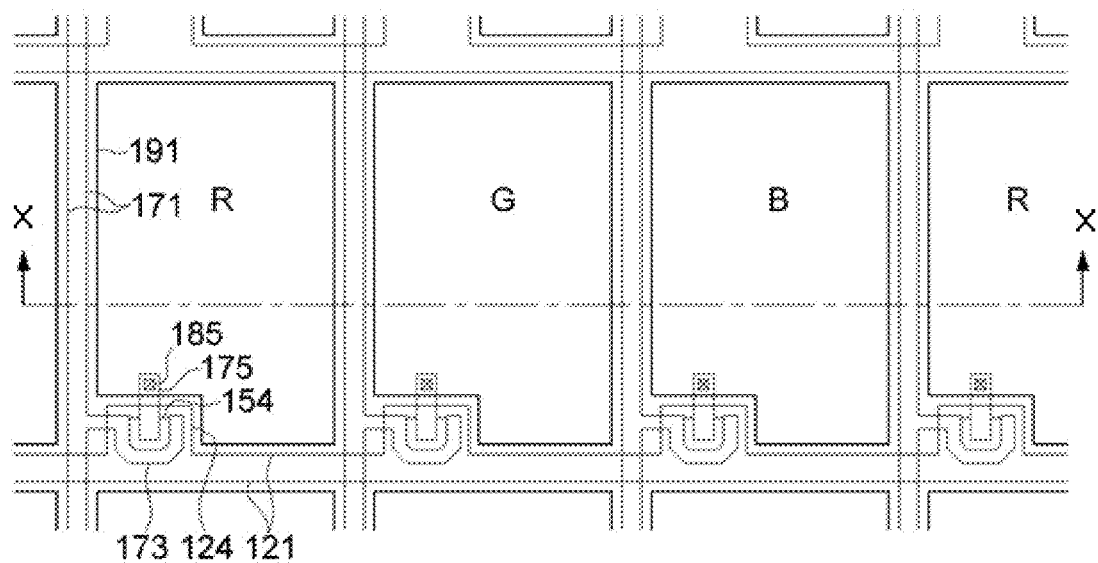
FIG. 9 is a plan layout view illustrating a plurality of adjacent pixels of a display device according to an exemplary embodiment of the present invention.

FIG. 8 is a schematic cross-sectional view illustrating a display device according to an exemplary embodiment of the present invention; FIG. 9 is a plan layout view illustrating a plurality of adjacent pixels of a display device according to an embodiment of the present invention; and FIG. 10 is a cross-sectional view illustrating a display panel taken along line X-X of a pixel area according to an exemplary embodiment of the present invention.

Figure 10:
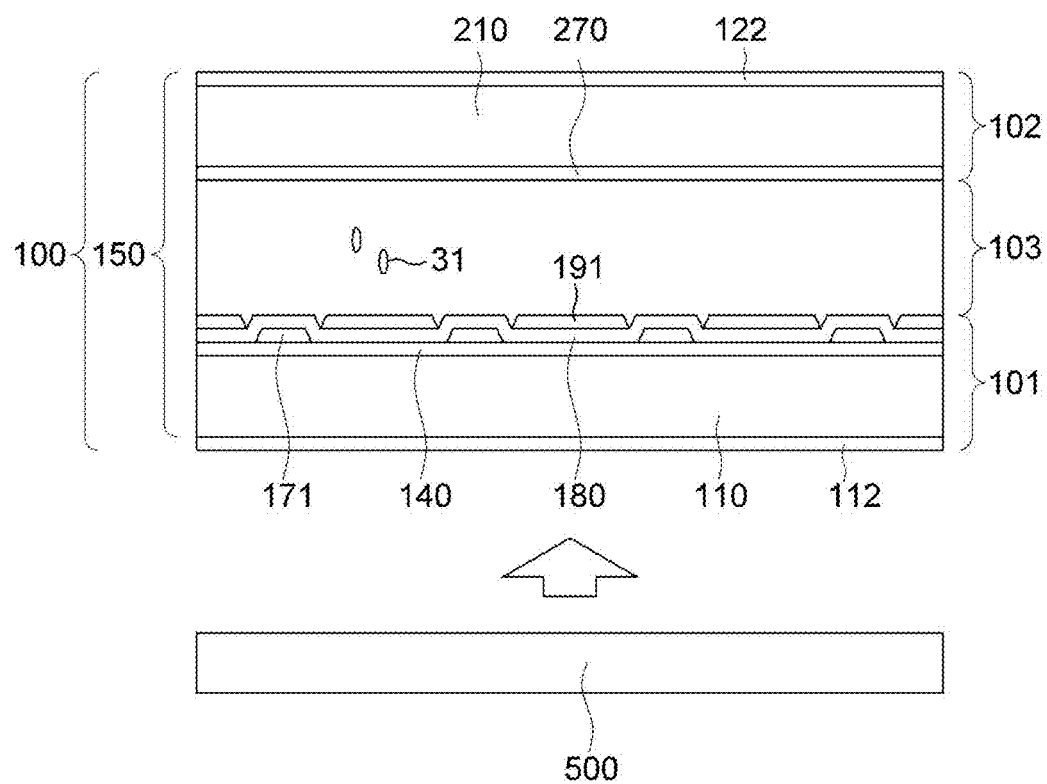
FIG. 10 is a cross-sectional view illustrating a display panel taken along line X-X of a pixel area according to an exemplary embodiment of the present invention.

First, with reference to FIGS. 8, 9, and 10, a display device according to an embodiment of the present invention includes a color conversion panel 300, a display panel 100, and a light assembly 500.

The display panel 100 displays images. The display panel 100 may include a display area in which images are displayed and a non-display area in which images are not displayed.

The display panel 100 may include a liquid crystal panel 150 that displays images and polarizers 112 and 122 on opposite sides of the liquid crystal panel 150.

A first polarizer 112 and a second polarizer 122 are disposed on opposite sides of the liquid crystal panel 150 to polarize the light incident from the light assembly 500. The first polarizer 112 may face the light assembly 500, and the second polarizer 122 may face or contact the color conversion panel 300.

In such an exemplary embodiment, one or more of a coating type polarizer and a wire grid polarizer may be used for the polarizer 112. The polarizer 122 may be located on an upper surface of the display panel 100 in various manners, e.g., in the form of a film, coating, and attachment. However, the above is only given by way of example, and the inventive concepts are not limited thereto.

The light assembly 500 provides a first light L1 to the display panel 100. The first light L1 may have a wavelength within the wavelength range of visible light, and may be a blue light, for example.

The light assembly 500 may include a light source disposed on a back surface of the first polarizer 12 to emit the light, and a light guide plate (not illustrated) receiving the light and guiding the light toward the display panel 100 and the light conversion panel 300.

As an example, the light assembly 500 may include at least one light emitting diode ("LED"), e.g., a blue LED. The light assembly 500 according to an exemplary embodiment of the present invention may be an edge type light assembly in which light sources of the light assembly 500 are disposed on at least one side surface of the light guide plate, or a direct type light assembly in which the light sources of the light assembly 500 are disposed at a portion directly below the light guide plate (not illustrated). However, the inventive concepts are not limited thereto.

The color conversion panel 300 described above with reference to FIGS. 1 to 7 is disposed on the display panel 100, and converts the color of the light emitted from the light source and emitted through the display panel 100.

FIG. 9 is a plan layout view illustrating a plurality of adjacent pixels of a display device according to an exemplary embodiment of the present invention.

Hereinafter, the above-described display panel 100 will be described in more detail with reference to FIG. 9. Since the light assembly 500 is substantially the same as the light assembly 500 described above, the descriptions thereof will be omitted.

The liquid crystal panel 150 (see FIG. 10) includes a lower substrate 101 including a thin film transistor, an upper substrate 102 facing the lower substrate 101 and including a second insulating substrate 210, and a liquid crystal layer 103 between the lower substrate 101 and the upper substrate 102, so as to display images.

The polarizers 112 and 122 are disposed on opposite sides of the liquid crystal panel 150.

A plurality of pixel electrodes are disposed in a matrix form on a first insulating substrate 110 included in the lower substrate 101.

On the first insulating substrate 110 are disposed a gate line 121 which extends in a low direction and includes a gate electrode 124; a gate insulating layer 140 on the gate line 121; a semiconductor layer 154 on the gate insulating layer 140; a data line 171 and a drain electrode 175 which are disposed on the semiconductor layer 154, extend in a column direction, and include a source electrode 173; a protective layer 180 on the data line 171 and the drain electrode 175; and a pixel electrode 191 physically and electrically connected to the drain electrode 175 through a contact hole 185.

The semiconductor layer 154 located on the gate electrode 124 forms a channel layer at an area exposed by the source electrode 173 and the drain electrode 175, and the gate electrode 124, the semiconductor layer 154, the source electrode 173, and the drain electrode 175 form one thin film transistor.

Next, the common electrode 270 is located on the second insulating substrate 210 which faces the first insulating substrate 110 and is spaced apart from the first insulating substrate 110.

The common electrode 270, which receives a common voltage, forms an electric field, along with the pixel electrode 191, and aligns liquid crystal molecules 31 located in the liquid crystal layer 103. The common electrode 270 may be formed on the lower substrate 101.

The liquid crystal layer 103 includes the plurality of liquid crystal molecules 31, and an alignment direction of the liquid crystal molecules 31 is controlled by the electric field between the pixel electrode 191 and the common electrode 270. Images may be displayed by controlling a transmittance of the light received from the light assembly 500 according to the alignment of the liquid crystal molecules.

The black matrix BM is formed corresponding to a light blocking area of the first substrate 102. The light blocking area may be defined as an area at which the data line DL, the thin film transistor TFT, and the gate line GL are formed. Since the pixel electrode PE is not typically formed in the light blocking area, the liquid crystal molecules are not aligned therein and light leakage may occur. Accordingly, the black matrix BM is formed at the light blocking area to block the light leakage. Accordingly, the black matrix BM may be formed on a substrate of the color conversion panel 300 (see FIG. 8), or may be formed to be included in the display panel 100 (see FIG. 8).

The black matrix BM may be formed by forming a blocking filter for absorbing light and patterning the blocking filter through photolithography, or alternatively, may be formed by another method, e.g., an inkjet method.

Figure 11:
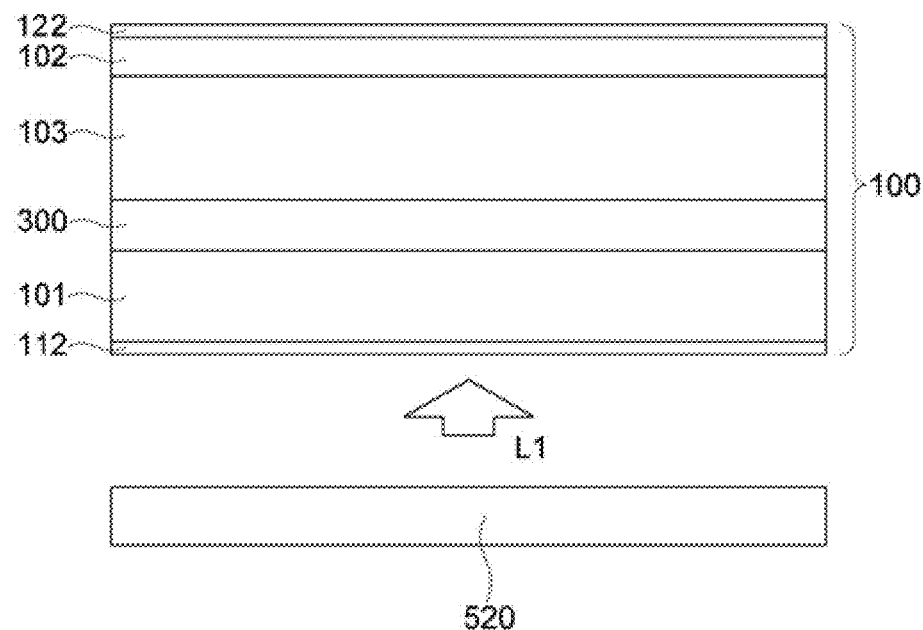
FIG. 11 is a schematic cross-sectional view illustrating a display device according to still another exemplary embodiment of the present invention.

FIG. 11 is a schematic cross-sectional view illustrating a display device according to another exemplary embodiment of the present invention.

Referring to FIG. 11, a display panel 100 includes a lower substrate 101 including a thin film transistor, an upper substrate 102 facing the lower substrate 101 and including a second insulating substrate 210, and a liquid crystal layer 103 between the lower substrate 101 and the upper substrate 102, so as to display images. Polarizers 112 and 122 are disposed on outer surfaces of the lower substrate 101 and the upper substrate 102, respectively.

In contrast to the exemplary embodiments illustrated in FIGS. 7 to 10, in an exemplary embodiment with reference to FIG. 11, a color conversion panel is disposed inside the display panel 100, rather than outside the display panel 100. That is, in the display device according to another exemplary embodiment of the present invention, the color conversion panel is disposed between the lower substrate 101 and the liquid crystal layer 103.

Although the color conversion panel 300 is disposed inside the display panel 200, the display device may have the same effects as an exemplary embodiment described with reference to FIG. 1.

Figure 12:
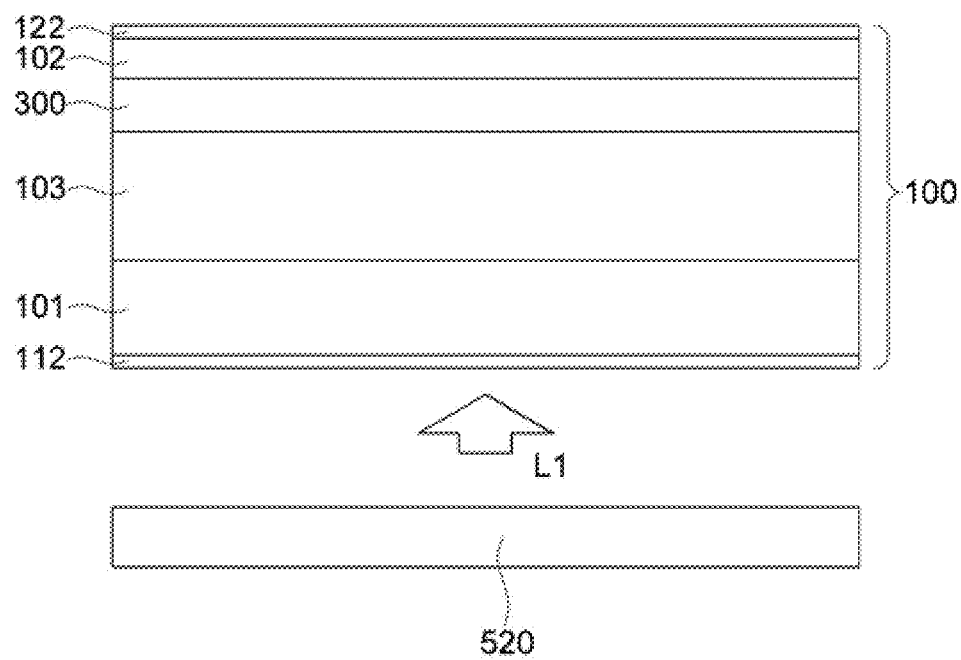
FIG. 12 is a schematic cross-sectional view illustrating a display device according to still another exemplary embodiment of the present invention.

FIG. 12 is a schematic cross-sectional view illustrating a display device according to another exemplary embodiment of the present invention.

Referring to FIG. 12, a display panel 100 includes a lower substrate 101 including a thin film transistor, an upper substrate 102 facing the lower substrate 101 and including a second insulating substrate 210, and a liquid crystal layer 103 between the lower substrate 101 and the upper substrate 102, so as to display images. Polarizers 112 and 122 are disposed on outer surfaces of the lower substrate 101 and the upper substrate 102, respectively.

In contrast to the exemplary embodiments illustrated in FIGS. 7 to 9, in an exemplary embodiment with reference to FIG. 12, a color conversion panel 300 is disposed inside the display panel 100, rather than outside the display panel 100. That is, in the display device according to another exemplary embodiment of the present invention, the color conversion panel is disposed between the upper substrate 102 and the liquid crystal layer 103.

Although the color conversion panel 300 is disposed inside the display panel 200, the display device may have the same effects as the exemplary embodiment described with reference to FIG. 1.

Figure 13:
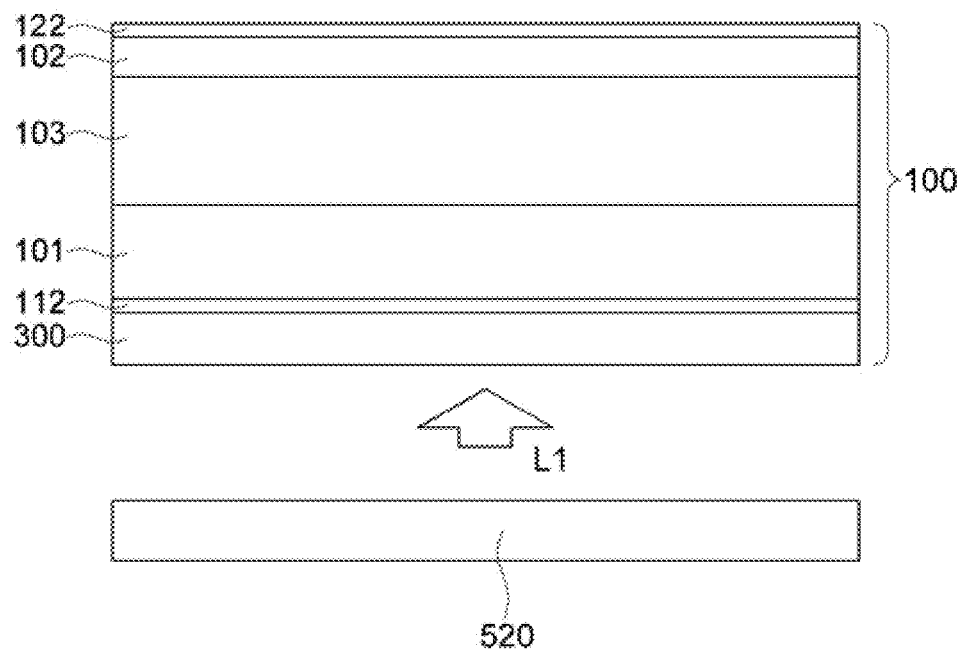
FIG. 13 is a schematic cross-sectional view illustrating a display device according to still another exemplary embodiment of the present invention.

FIG. 13 is a schematic cross-sectional view illustrating a display device according to still another embodiment of the present invention.

Referring to FIG. 13, a display panel 100 includes a lower substrate 101 including a thin film transistor, an upper substrate 102 facing the lower substrate 101 and including a second insulating substrate 210, and a liquid crystal layer 103 between the lower substrate 101 and the upper substrate 102, so as to display images.

In contrast to the exemplary embodiments illustrated in FIGS. 7 to 12, in an exemplary embodiment with reference to FIG. 13, a color conversion panel 300 is disposed between the display panel 100 and a light assembly 500.

Although the color conversion panel 300 is disposed below the display panel 200, the display device may have the same effects as the exemplary embodiment described with reference to FIG. 1.

Hereinafter, a process of manufacturing a display device according to an exemplary embodiment of the present invention will be described with reference to FIGS. 14A to 14E and FIGS. 15A-15D.

First, a display substrate is prepared for manufacturing a display device.

The display substrate is prepared by forming the thin film transistor on the first substrate and forming the pixel electrode connected to the thin film transistor. The method of forming the thin film transistor and the pixel electrode is obvious to those skilled in the art, and thus, will be omitted for conciseness.

As described above with reference to FIGS. 1 to 13, the color conversion panel may be disposed on the display panel, or may be disposed between the first substrate and the second substrate of the display panel.

Accordingly, a substrate 310 of a color conversion panel 300 to be described with reference to FIGS. 14A to 17F may be the first substrate on which the thin film transistor and the pixel electrode of the display panel are formed. Alternatively, the substrate 310 of the color conversion panel 300 may be the second substrate of the display panel.

Figure 14A:
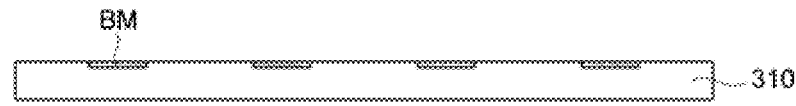
FIG. 14A, FIG. 14B, FIG. 14C, FIG. 14D, and FIG. 14E are cross-sectional views illustrating a color conversion unit for explaining a process of manufacturing a display device of an exemplary embodiment according to an exemplary embodiment of the present invention.
Figure 14B:
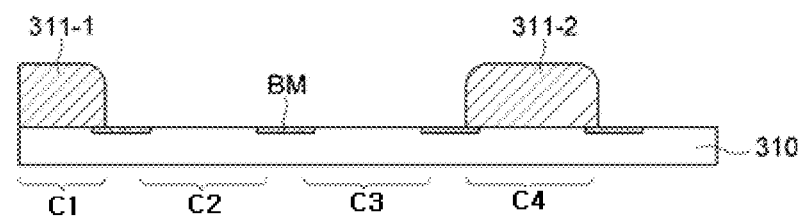
Figure 14C:
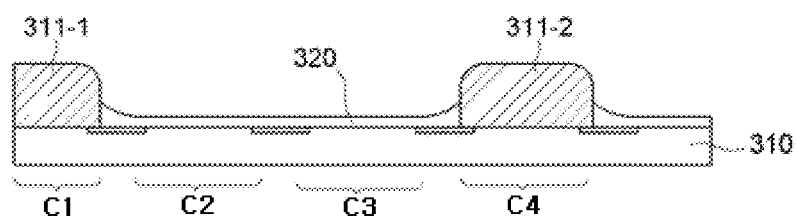

FIGS. 14A to 14E are cross-sectional views illustrating a color conversion panel for explaining a process of manufacturing a display device, and FIGS. 15A-15D are cross-sectional views for explaining in detail a step in the manufacturing process shown in FIG. 14C.

First, as illustrated in FIG. 14A, a black matrix BM for partitioning first, second, third, and fourth pixel areas C1, C2, C3, and C4 of the substrate 310, which is transparent, is formed.

When the black matrix BM is disposed between the pixel areas, the light leakage and/or color mixture between each pixel area may be substantially prevented.

The black matrix BM may be formed through patterning on the substrate 310 in the method of photolithography using a BM mask, or alternatively may be formed by another method, e.g., an inkjet method.

In another exemplary embodiment, the black matrix BM may be omitted.

Next, as illustrated in FIG. 14B, a first color converting member 311 is formed.

A transparent polymer is applied to a surface of the substrate 310 with a uniform thickness. A thickness of the transparent polymer may be in a range from about 6 µm to about 7 µm. Next, a pattern designed in a mask is aligned on a glass substrate and then exposed. The photoresist solution is then developed, and thus, a photoresist pattern may be formed.

The blue light blocking filter 320 is coated on the substrate 310 on which the first color converting member 311 is disposed, as illustrated in FIG. 14C.

The formation of the blue light blocking filter 320 will be described below with reference to FIG. 15A to FIG. 15D.

Figure 15A:
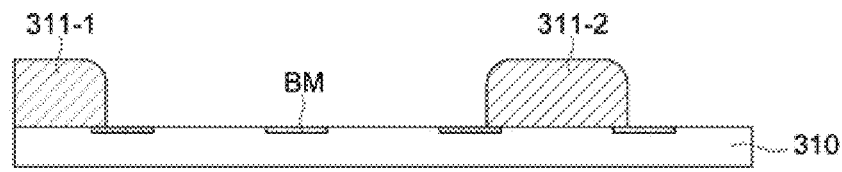
FIG. 15A, FIG. 15B, FIG. 15C, and FIG. 15D are cross-sectional views illustrating a color conversion unit for explaining a step in the manufacturing process shown in FIG. 14C.

As illustrated in FIG. 15A, a blue light blocking material is coated over an entire surface of the substrate on which the first color converting member 311 is formed.

Examples of the blue light blocking material may include a mixture of one of $BiO_2$, $ZnO$, and $Ce_2O_3$ and one of $ZrO_2$, $TiO$, and $Ar_2O_3$. However, the inventive concepts are not limited thereto, and the blue light blocking filter 320 may include or be formed of any material for blocking blue light. A viscosity of the blue light blocking material may be in a range from about 3 cps to about 4 cps.

Figure 15B:
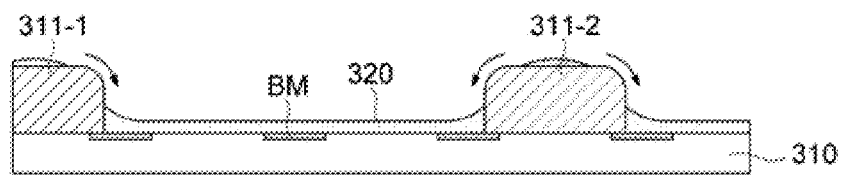

As illustrated in FIG. 15B, when the blue light blocking material is coated over an entire surface of the substrate on which the first color converting member 311 is formed, the blue light blocking material on the first color converting member 311 flows into an area where the first color converting member 311 is not formed.

Accordingly, the first color converting member 311 and the blue light blocking filter 320 directly contact each other, and the blue light blocking filter 320 is formed such that a boundary portion between the first color converting member 311 and the blue light blocking filter 320 is thicker than a center portion of the blue light blocking filter 320.

In addition, an inclination is formed at the boundary portion between the first color converting member 311 and the blue light blocking layer 320 due to the flow of the blue light blocking material on the first color converting member 311.

After the blue light blocking material flows down, the blue light blocking material remaining on the first color converting member 311 is about 800 angstroms to about 900 angstroms.

Figure 15C:
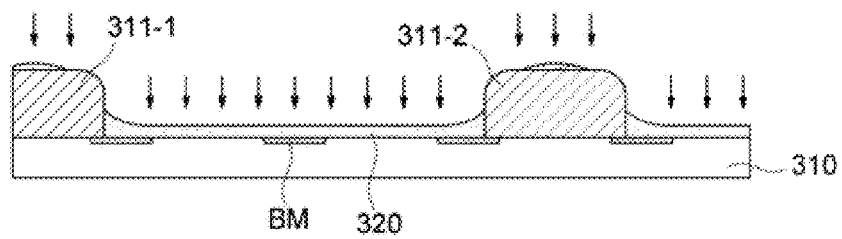

As illustrated in FIG. 15C, the substrate on which the first color converting member 311 and the blue light blocking filter 320 are formed is subjected to an ashing process. In such an exemplary embodiment, an $O_2$ gas is used for ashing.

Figure 15D:
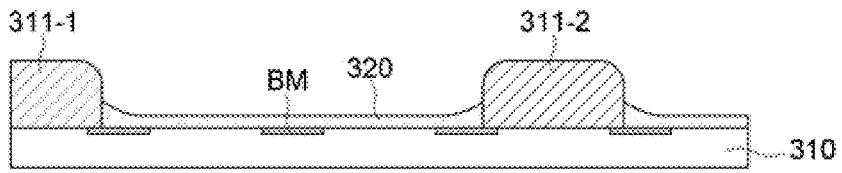

As illustrated in FIG. 15D, the blue light blocking material is hardly left on the first color converting member 311 of the substrate 310 on which the ashing process is completed.

A first mask of the first color converting member 311 may have a groove portion or a protruding portion as described above in order to substantially minimize an amount of the blue light blocking material remaining on the first color converting member 311.

For example, the blue light blocking material may be easily drained along the groove portion 601, as illustrated in FIG. 6A.

Figure 14D:
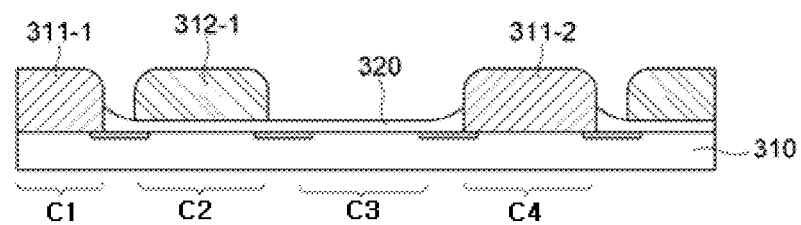

Referring to FIG. 14D, a second color conversion quantum dot photoresist (B-PR) is applied on the blue light blocking filter 320 and then is exposed, using a second mask. Accordingly, a second color converting member 312-1 is formed.

Figure 14E:
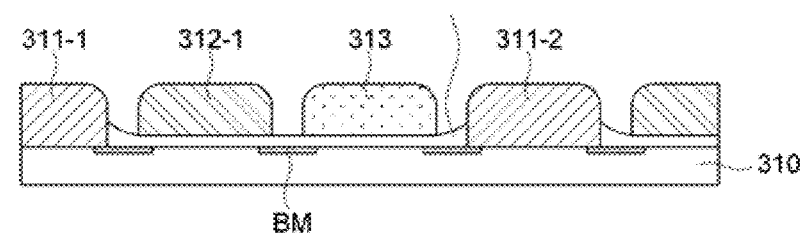

Next, as illustrated in FIG. 14E, a third color converting member 313-1 is formed by a third color conversion quantum dot photoresist B-PR, using a third mask.

FIG. 16A to FIG. 16F are cross-sectional views illustrating a color conversion unit for explaining a process of manufacturing a display device according to another exemplary embodiment of the present invention.

Figure 16A:
FIG. 16A, FIG. 16B, FIG. 16C, FIG. 16D, FIG. 16E, and FIG. 16F are cross-sectional views illustrating a color conversion unit for explaining a process of manufacturing a display device according to another exemplary embodiment of the present invention

FIG. 16A shows a first color converting member 311-1 on a substrate on which a black matrix BM is formed according to the method described above with reference to FIG. 13.

Figure 16B:
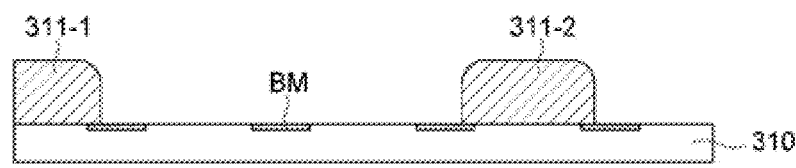

Next, as illustrated in FIG. 16B, a transparent polymer is applied to a surface of a substrate 310 with a uniform thickness so as to form the first color converting member 311-1. A thickness of the transparent polymer may be in a range from about 6 μm to about 7 μm. Next, a pattern designed on a mask is aligned on a glass substrate and then exposed. The photoresist solution is then developed, and thus, a photoresist pattern may be formed.

Figure 16C:
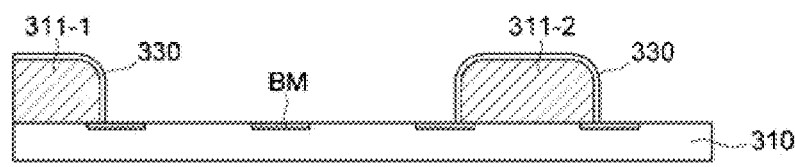

As illustrated in FIG. 16C, an element having hydrophobicity against the blue light blocking filter is coated over a surface of the first color converting member 311. An example of the element having hydrophobicity against the blue light blocking filter may be $CF_4$. For example, a $CF_4$ plasma treatment may be performed.

Figure 16D:
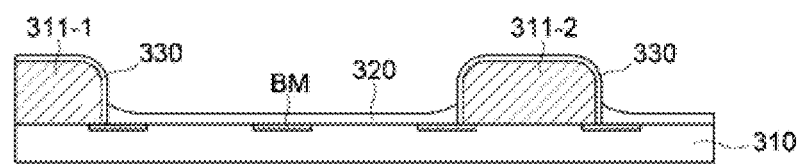

As illustrated in FIG. 16D, a blue light blocking material is coated using a step difference between the first color converting members 311, such that a blue light blocking filter is formed.

The blue light blocking filter 320 may be formed by coating the blue light blocking material over an entire surface of a substrate on which the first color converting member 311 is formed without using a mask.

The blue light blocking filter 320 is formed between a first color converting member 311-1 and a first color converting member 311-2 adjacent to the first color converting member 311-1.

The blue light blocking filter 320 is formed to have a height in a range from about 1.2 μm to about 1.7 μm.

Examples of the blue light blocking material may include a mixture of one of $BiO_2$, ZnO, and $Ce_2O_3$ and one of $ZrO_2$, TiO, and $Ar_2O_3$. However, the inventive concepts are not limited thereto, and the blue light blocking filter 320 may include, or be formed of, any material for blocking blue light. A viscosity of the blue light blocking material may be in a range from about 3 cps to about 4 cps.

Since the first color converting member 311 is coated with a material having hydrophobicity, although the blue color light blocking material is coated over an entire surface of the first color converting member 311, the blue color light blocking material may hardly remain on the first color converting member 311.

Accordingly, the first color converting member 311 and the blue light blocking filter 320 directly contact each other, and the blue light blocking filter 320 is formed such that a boundary portion between the first color converting member 311 and the blue light blocking filter 320 is thicker than a center portion of the blue light blocking filter 320.

In addition, inclination is formed at the boundary portion between the first color converting member 311 and the blue light blocking layer 320 due to a flow of the blue light blocking material on the first color converting member 311.

A first mask of the first color converting member 311 may have a groove portion or a protruding portion as described above, for example, the groove portion 601 or the protruding portion 602, in order to substantially minimize an amount of the blue light blocking material remaining on the first color converting member 311.

For example, the blue light blocking material may be easily drained along the groove portion 601 which extends in a width direction on a plane in the first color converting member 311, as illustrated in FIG. 6A.

Figure 16E:
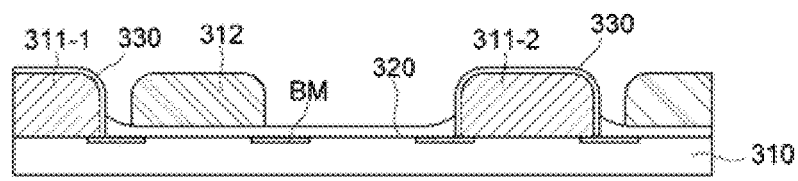
Figure 16F:
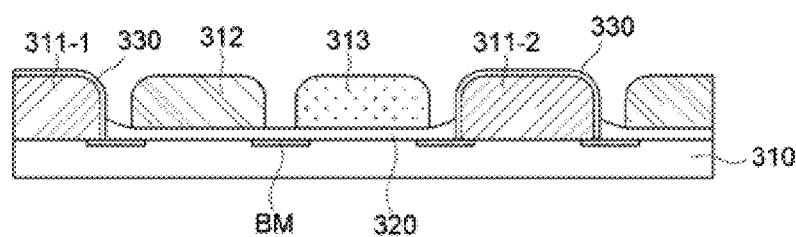

As illustrated in FIGS. 16E and 16F, a second color conversion quantum dot photoresist B-PR is applied on the blue light blocking layer 320 on the surface of the substrate 310 and then exposed, using a second mask, and thus a second color converting member 312 is formed. In addition, a third color converting member 313 is formed by a third color conversion quantum dot photoresist B-PR using a third mask.

FIG. 17A to FIG. 17F are cross-sectional views illustrating a blue light blocking layer for explaining a process of manufacturing a display device according to another exemplary embodiment of the present invention.

Figure 17A:
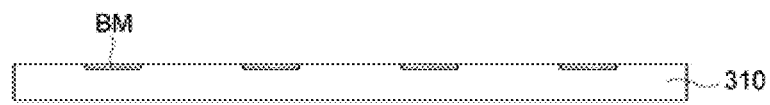
FIG. 17A, FIG. 17B, FIG. 17C, FIG. 17D, FIG. 17E, and FIG. 17F are cross-sectional views illustrating a color conversion unit for explaining a process of manufacturing a display device according to still another exemplary embodiment of the present invention.

FIG. 17A shows a first color converting member 311-1 on a substrate on which a black matrix BM is formed according to the method described above with reference to FIGS. 14A-14E.

Figure 17B:
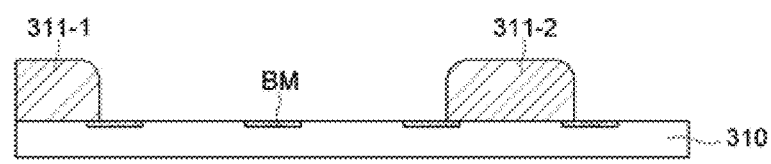

Next, as illustrated in FIG. 17B, a transparent polymer is applied to a surface of a substrate 310 with a uniform thickness so as to form a first color converting member. A thickness of the application may be in a range from about 6 μm to about 7 μm. Next, a pattern designed on a mask is aligned on a glass substrate and then exposed. The photoresist solution is then developed, and thus, a photoresist pattern may be formed.

Figure 17C:
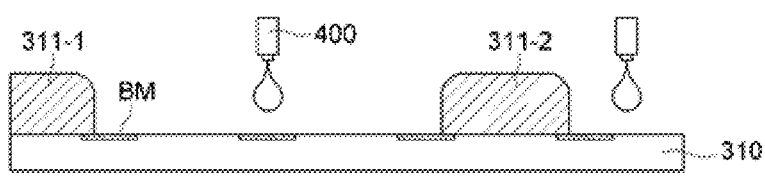
Figure 17D:
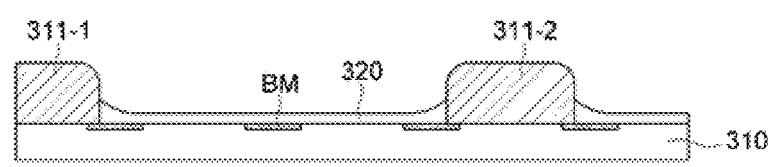

As illustrated in FIG. 17C and FIG. 17D, a blue light blocking filter 320 is printed using a step difference between the first color converting members 311.

The blue light blocking filter 320 is partially printed through an inkjet method without using a mask.

For example, a blue light blocking material is jetted using nozzle 400 between a first color converting member 311-1 and a first color converting member 311-2 adjacent to the first color converting member 311-1, and thus, a blue light blocking filter is formed.

The blue light blocking filter 320 is formed at an area between the first color converting member 311-1 and the adjacent first color converting member 311-2.

The blue light blocking filter 320 is formed to have a height in a range from about 1.2 μm to about 1.7 μm.

Examples of the blue light blocking material may include a mixture of one of $BiO_2$, ZnO, and $Ce_2O_3$ and one of $ZrO_2$, TiO, and $Ar_2O_3$. However, the inventive concepts are not limited thereto, and the blue light blocking filter 320 may include or be formed of any material for blocking blue light. A viscosity of the blue light blocking material may be in a range from about 3 cps to about 4 cps.

Accordingly, the first color converting member 311 and the blue light blocking filter 320 directly contact each other, and the blue light blocking filter 320 is formed such that a boundary portion of the first color converting member 311 and the blue light blocking filter 320 is thicker than a center portion of the blue light blocking filter 320.

In addition, an inclination is formed at the boundary portion between the first color converting member 311 and the blue light blocking layer 320.

Figure 17E:
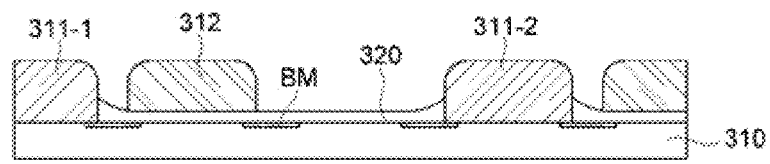
Figure 17F:
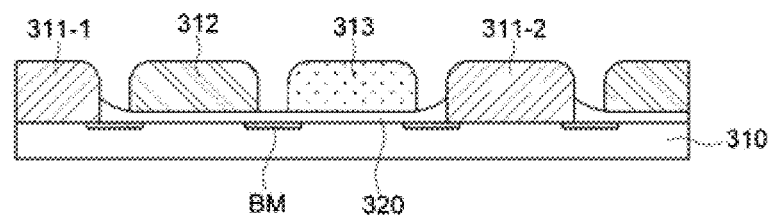

As illustrated in FIG. 17E and FIG. 17F, a second color conversion quantum dot photoresist B-PR is applied on the blue light blocking layer 320 on the surface of the substrate 310, and then exposed, using a second mask, such that a second color converting member 312 is formed. In addition, a third color conversion quantum dot photoresist B-PR is applied on the surface of the substrate 310, and then exposed, using a third mask, such that a third color converting member 313 is formed.

As set forth hereinabove, in a method of manufacturing display device including a color conversion unit according to one or more exemplary embodiments, the manufacturing process is simplified by forming the blue light blocking filter without using a mask, and thus, the cost may be reduced and time may be saved.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel;
a light source configured to provide light to the display panel; and
a color conversion unit configured to convert a color of the light incident from the light source into a different color,
wherein:
the color conversion unit comprises:
a first color converting member, a second color converting member, and a third color converting member, located on a substrate, which are configured to convert the color of the light incident from the light source into different colors from each other, respectively, and output the lights having converted colors;
a blue light blocking filter located to overlap the second color converting member and the third color converting member; and
the first color converting member further comprises a coating layer having hydrophobicity against the light blocking filter.

2. The display device of claim 1, wherein a side surface of the first color converting member contacts a side surface of the blue light blocking filter.

3. The display device of claim 1, wherein a thickness of a boundary portion of the blue light blocking filter is greater than a thickness of a center portion of the blue light blocking filter by about 0.05 μm to about 0.1 μm.

4. The display device of claim 1, wherein the coating layer comprises tetrafluorocarbon.

5. The display device of claim 1, wherein the blue light blocking filter has an inclination angle in a range from about 10 degrees to about 40 degrees at a boundary portion.

6. The display device of claim 1, wherein the first color converting member has a height in a range from about 6 μm to about 7 μm.

7. The display device of claim 1, wherein the blue light blocking filter has a height in a range from about 1.2 μm to about 1.7 μm.

8. The display device of claim 1, further comprising a black matrix disposed between the color converting members.

9. The display device of claim 1, wherein the color conversion unit is disposed on the display panel.

10. The display device of claim 1, wherein:
the display panel comprises:
a first substrate on which a thin film transistor and a pixel electrode are disposed;
a second substrate opposing the first substrate; and
a liquid crystal layer disposed between the first substrate and the second substrate; and
the color conversion unit is disposed between the first substrate and the liquid crystal layer or between the second substrate and the liquid crystal layer.

11. The display device of claim 1, wherein the second color converting member and the third color converting member comprise quantum dots.

12. The display device of claim 1, wherein the light source is a blue light source.

13. A display device comprising:
a display panel;
a light source configured to provide light to the display panel; and
a color conversion unit configured to convert a color of the light incident from the light source into a different color,
wherein:
the color conversion unit comprises:
a first color converting member, a second color converting member, and a third color converting member, located on a substrate, which are configured to convert the color of the light incident from the light source into different colors from each other, respectively, and output the lights having converted colors;
a blue light blocking filter located to overlap the second color converting member and the third color converting member; and
the first color converting member has a groove portion which extends in a width direction.

14. A display device comprising:
a display panel;
a light source configured to provide light to the display panel; and
a color conversion unit configured to convert a color of the light incident from the light source into a different color,
wherein:
the color conversion unit comprises:
a first color converting member, a second color converting member, and a third color converting member, located on a substrate, which are configured to convert the color of the light incident from the light source into different colors from each other, respectively, and output the lights having converted colors; and a blue light blocking filter located to overlap the second color converting member and the third color converting member;

the first color converting member comprises a plurality of protruding portions which protrude in a width direction in a plan view; and the plurality of protruding portions are arranged alternately with each other.

15. A method of manufacturing a display device, the method comprising:

preparing a display substrate;

forming a first color converting member on the display substrate using a first mask;

forming a blue light blocking filter by coating a blue light blocking material on a substrate on which the first color converting member is formed;

forming a second color converting member on the blue light blocking filter using a second mask; and forming a third color converting member on the blue light blocking filter using a third mask, wherein forming of the first color converting member further comprises forming, on the first color converting member, a coating layer having hydrophobicity against the blue light blocking filter.

16. The method of claim 15, wherein preparing of the display substrate comprises:

forming a thin film transistor on a first substrate;

forming a pixel electrode connected to the thin film transistor.

17. A method of manufacturing a display device, the method comprising:

preparing a display substrate;

forming a first color converting member on the display substrate using a first mask;

forming a blue light blocking filter by coating a blue light blocking material on a substrate on which the first color converting member is formed;

forming a second color converting member on the blue light blocking filter using a second mask; and forming a third color converting member on the blue light blocking filter using a third mask, wherein:

forming of the first color converting member comprises forming a first color converting member having a groove portion using the first mask; and the groove portion extends in a width direction.

* * * * *